Figure 1:
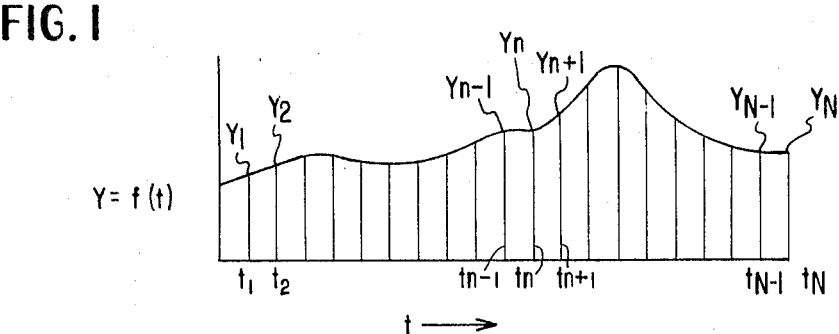

[11] 3,581,199

[72] Inventor David A. Spitz
 Columbus, Ohio
[21] Appl. No. 665,135
[22] Filed Sept. 1, 1967
[45] Patented May 25, 1971
[73] Assignee Industrial Nucleonics Corporation

[54] SPECTRUM ANALYZER INCLUDING SAMPLING AND SCALING MEANS
35 Claims, 5 Drawing Figs.
[52] U.S. Cl. .................................................. 324/77
[51] Int. Cl. .................................................. G01R 23/16
[50] Field of Search ......................................... 324/77 (A),
 77 (G), 78 (F), 115, 57 (N); 179/1 (AS)

[56] References Cited
UNITED STATES PATENTS
2,493,534  1/1950  Hawkins ............... 324/77(A)UX
3,217,251  11/1965  Andrew ................ 324/77(G)
3,382,435  5/1968  Bockholt .............. 324/77(B)
3,204,144  8/1965  Deavenport .......... 324/115UX

*Primary Examiner*—Edward E. Kubasiewicz
*Attorneys*—Allan M. Lowe, William T. Fryer, III, C. Henry Peterson and James J. O'Reilly ABSTRACT: Disclosed is a digital spectrum analyzer wherein the spectral content at a plurality of frequencies $w_m$ is computed in response to Fourier transforms at each frequency of an analyzed signal at a plurality of discrete time intervals. The Fourier transforms over each interval are combined to indicate the Fourier transform over the entire interval being considered. A further disclosed feature relates to determining with a specific degree of certainty whether a frequency component is periodic. The determination is made by multiplying average power spectrum density over all the frequencies by a predetermined factor, dependent upon the degree of certainty desired. If the spectral density at a particular frequency is greater than the product, it can be assumed, with the predetermined degree of certainty, that the frequency is periodic. Another disclosed feature concerns automatically scaling the amplitudes of the spectral responses at a plurality of predetermined frequencies, whereby no off-scale readings are obtained.

INVENTOR
DAVID A. SPITZ
BY
ATTORNEY

INVENTOR
DAVID A. SPITZ
BY
ATTORNEY

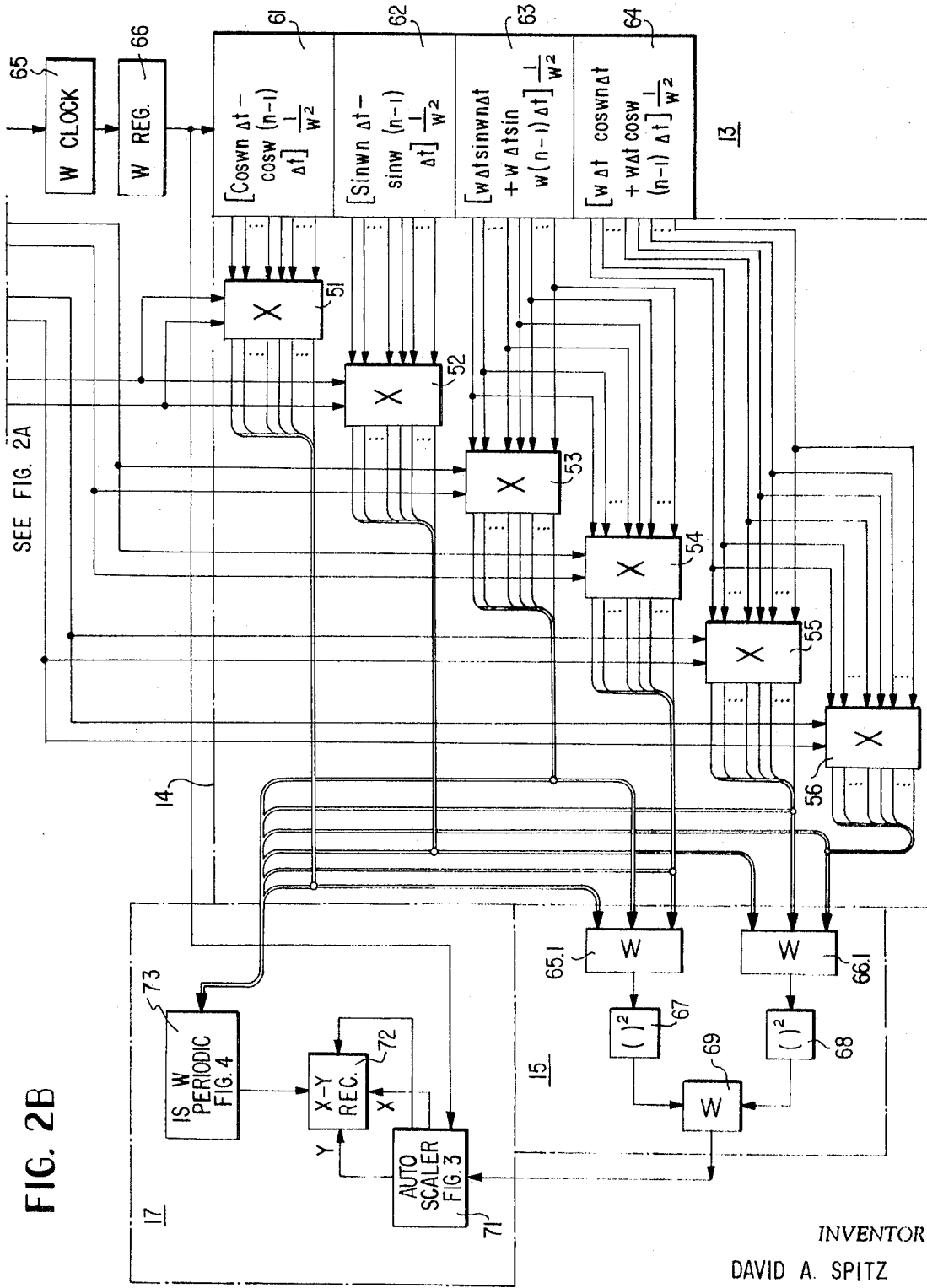

SPECTRUM ANALYZER INCLUDING SAMPLING AND SCALING MEANS

The present invention relates generally to spectrum analyzers and more particularly to a spectrum analyzer wherein an analyzed function is segmented into a plurality of time intervals, the Fourier transform components are computed for each of the intervals and combined.

It is well known that the spectral content $\Phi$ at a frequency $w_1$ of a function $f(t)$ can be computed from the Fourier transform as:

$$\varphi(w_1) = \lim_{T \to \infty} \frac{1}{2T} \left| \int_{-T}^{T} f(t) e^{-jw_1 t} dt \right|^2 \quad (1)$$

Many systems of the analog computer type have relied upon Equation (1) for determining the spectral content of a signal at a number of predetermined frequencies, $w_m$, by successively adjusting the value of $w_1$ in the equation. Analog computing equipment, however, is beset by many difficulties; inter alia, inaccuracies in computation and readout.

Hence, it is a desideratum of the present invention to provide a digital computer system for determining the spectral content of a function, $f(t)$, by relying upon the Fourier transform. A problem, however, exists with regard to the straightforward application of Equation (1) to digital computer usage because $f(t)$ is a continuous function and digital equipment is capable of handling only discrete or sampled functions.

It can be shown that if the function $f(t)$ is considered only over the time interval $t_1 \leq t \leq t_N$, the spectral content at a frequency $w_1$ can be represented as the sum of the Fourier transforms over a plurality of subintervals $(t_1-t_2) \ldots (t_{n-1}-t_n)(t_n-t_{n+1}) \ldots (t_{N-1}-t_N)$ as:

$$\varphi(w_1) = \left| \int_{t_1}^{t_2} f(t) e^{-jw_1 t} dt + \ldots + \int_{t_{n-1}}^{t_n} f(t) e^{-jw_1 t} dt \right.$$
$$\left. + \int_{t_n}^{t_{n+1}} f(t) e^{-jw_1 t} + \ldots + \int_{t_{N-1}}^{t_N} f(t) e^{-jw_1 t} \right|^2 \frac{1}{T} \quad (2)$$

If $f(t)$ is analytic in the interval $t_1 \leq t \leq t_N$, i.e., $f(t)$ and $f'(t)$ are continuous in the interval, and the subintervals are of sufficiently small duration, the value of $f(t)$ can be approximated as a linear function within each subinterval, from $t_n$ to $t_{n+1}$, in accordance with:

$$f(t) = \frac{(y_{n+1} - y_n)(t - t_n)}{\Delta t} + y_n \quad (3)$$

where:
$n$ is selectively every integer from 1 to $N-1$,
$y_{n+1}$ = the value of $f(t)$ at $t_{n+1}$,
$Y_n$ = the value of $f(t)$ $t=t_n$,
$t$ = *the time variable between $t_n$ and $t_{n+1}$*, and
$\Delta t = t_{n+1} - t_n$, assumed to be the same for each of the intervals.

By substituting Equation (3) into Equation (2), the spectral content for frequency $w_1$ can be elegantly represented as:

$$\varphi(w_1) = \left| \sum_{n=1}^{N} \int_{t_n}^{t_{n+1}} \left[ \frac{(y_{n+1} - y_n)(t - t_n)}{\Delta t} + y_n \right] e^{-jw_1 t} dt \right|^2 \quad (4)$$

Expanding $e^{jw_1 t} = \cos w_1 t - j \sin w_1 t$ and integrating, yields the real and imaginary portions of the terms in Equation (4) as:

$$R(w) = \frac{1}{w^2 \Delta t} \sum_{n=1}^{n=N} A_n (\cos wn\Delta t - \cos w(n-1)\Delta t)$$
$$+ B_n w\Delta t \sin wn\Delta t + C_n w\Delta t \sin w(n-1)\Delta t \quad (5)$$

$$I(w) = \frac{1}{w^2 \Delta t} \sum_{n=1}^{n=N} A_n (\sin wn\Delta t - \sin w(n-1)\Delta t)$$
$$+ B_n w\Delta t \cos wn\Delta t + C_n w\Delta t \cos w(n-1)\Delta t \quad (6)$$

where:

$$A_n = y_{n+1} - y_n \quad (7)$$
$$B_n = nA_n + D_n \quad (8)$$
$$C_n = -(n-1)A_n - D_n \quad (9)$$
$$D_n = ny_n - (n-1)y_{n+1} \quad (10)$$

Taking the sum of the squares of the real and imaginary portions of the Fourier transforms of Equation (4), gives total power spectral density at frequency $w_1$ as:

$$\varphi(w_1) = \frac{R^2(w_1) + I^2(w_1)}{T} \quad (11)$$

In Equations (5) and (6), $R(w)$ and $I(w)$ are the real and imaginary components of the Fourier components for any frequency $w$, while in Equation (11), $R(w_1)$ and $I(w_1)$ are the real and imaginary Fourier components of a particular frequency, $w_1$.

According to the invention, a signal to be analyzed is sampled at a plurality of discrete points within an interval. A digital apparatus stores the values of the signal at the sampled points and thereafter successively computes the spectral data for each frequency, $w_m$, at a relatively rapid rate in accordance with Equations (5)—(11).

According to another aspect of the present invention, a determination is made, with a predetermined degree of certainty, that a frequency in the spectrum is periodic. The theory for determining whether a predetermined frequency is periodic is based on probability and Fourier integral principles. Utilizing these principles, it can be shown that the product of a predetermined factor with the average spectral density of a signal over an entire spectrum is a measure for determining if a particular frequency in the spectrum is periodic. The product of average density and the predetermined factor sets a confidence level that is compared with values of spectral density at each frequency within the spectrum. If the spectral density for one frequency exceeds the confidence level, the frequency is periodic with a probability determined by the selected degree of certainty.

Because of the relatively complex mathematical nature of deriving the formulation required for determining if a frequency is periodic or not, only the results of that analysis are given herein for confidence levels of 95 percent and 99 percent, respectively, as:

for a confidence level of 95 percent, $\Phi(w_1)$ is periodic if:
$\Phi(w_1) \geq 3.86[\Phi(w)_{AV}]$ (12);
for a confidence level of 99 percent $\Phi(w_1)$ is periodic if:
$\Phi(w_1) \geq 6.66[\Phi(w)_{AV}]$ (13), where:
$[\Phi(w)_{AV}]$ is the average value of the power spectrum for all of the frequencies in the spectrum.

The determination of whether a frequency component is periodic, in accordance with Equations (12) or (13), is made utilizing digital techniques and apparatus having many components in common with the apparatus necessary for deriving spectral information from Equations (4)—(11). In consequence, once the spectral data are derived, the periodicity determination is relatively facile.

The determination of whether a component is periodic is useful in analyzing signals derived from online processes. In particular, the determination can be utilized with great advantage in locating malfunctions in process equipment, such as paper mills. If a frequency component is found to be periodic with a given confidence level, it can be frequently assumed, from prior experience, that a certain component in the process is malfunctioning.

According to still another aspect of the present invention, the spectral density at a plurality of frequencies is recorded on an X-Y digital plotter, such as a typewriter. Because no a priori information is usually available concerning the relative amplitudes of the spectral components, it is likely that many off-scale points will be derived if conventional X-Y plotting means are employed. In the alternative, the largest amplitude of the X-Y plot may be insufficient to enable meaningful results to be obtained from the plot. In either situation, important data will be lost if the spectral amplitudes are passed unmodified to an X-Y digital recorder. While the recorder response can be adjusted empirically until a record having the desired response is obtained, empirical adjustment is time consuming and generally undesirable. The present invention provides a means for automatically adjusting the recorder response, whereby no off-scale amplitudes are derived and the amplitudes recorded are of sufficiently large values to obtain meaningful results. A scale factor is introduced in response to the largest amplitude of the spectral information, which scale factor can be recorded on the record accordingly proportioned.

It is, accordingly, an object of the present invention to provide a new and improved spectrum analyzer.

Another object of the present invention is to provide a spectrum analyzer system and method particularly adapted for digital computer utilization.

Another object of the present invention is to provide a digital spectrum analyzer wherein signal amplitudes determine spectral content of the signal.

A further object of the present invention is to provide a spectrum analyzation system and method wherein the Fourier transform of a signal is computed in each of a plurality of continuous intervals and the transforms are summed together to provide an indication of the signal spectral content.

A further object of the present invention is to provide a system for determining if a frequency component within a spectrum is periodic, with a predetermined degree of certainty.

An additional object of the present invention is to provide a digital computer system for computing power spectral density and for determining whether components within the spectrum are periodic with a certain degree of likelihood.

Still a further object of the present invention is to provide a system for automatically adjusting the scale factor response of a recorder so that no off-scale or very low amplitude readings are derived, even though no a priori information is available concerning the amplitudes of the readings.

Still an additional object of the present invention is to provide in combination with a digital spectrum analyzer an X-Y recording system wherein no off-scale or low amplitude readings of power spectrum density are obtained.

Figure 3:
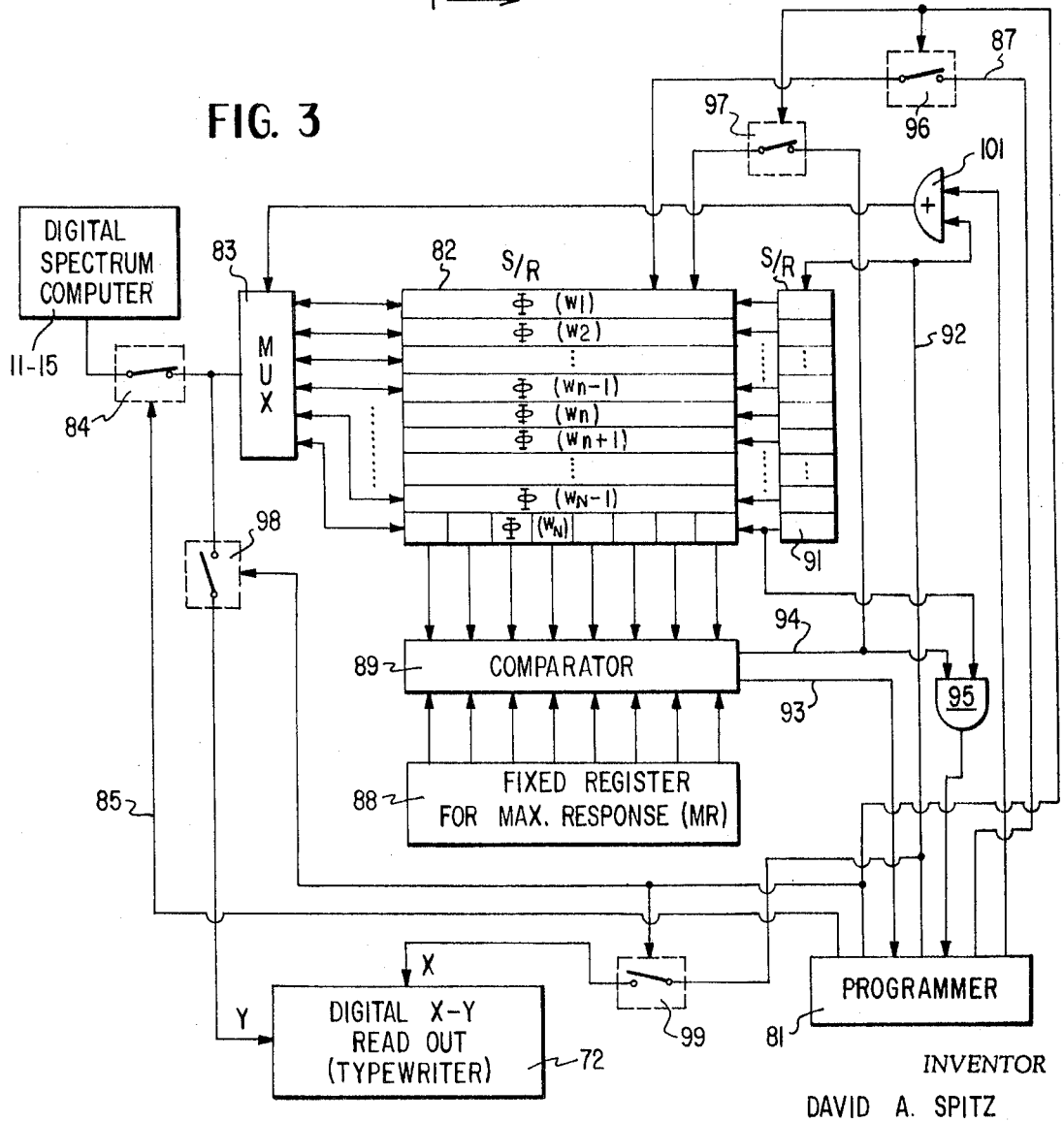
Figure 2A:
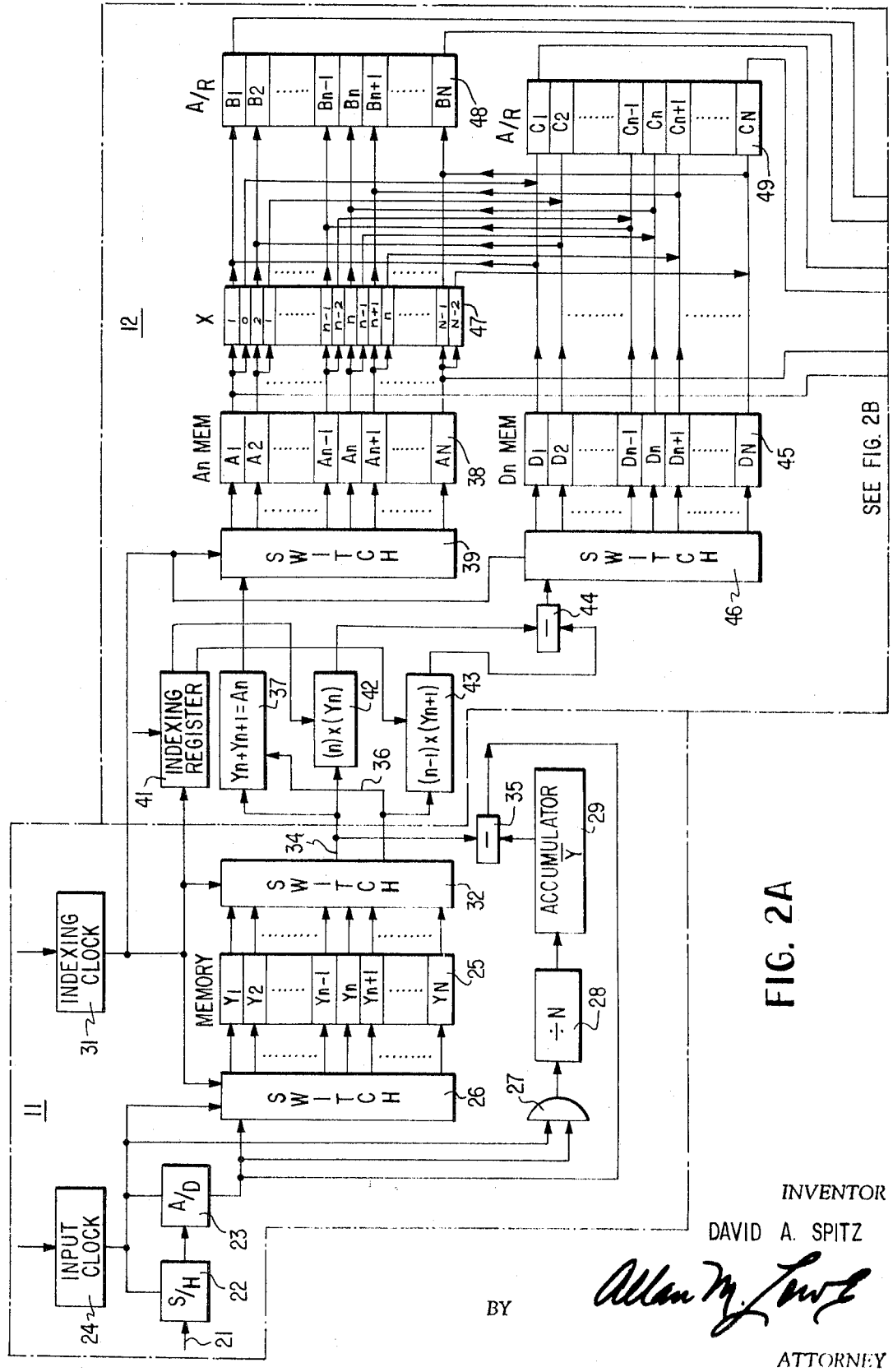
Figure 4:
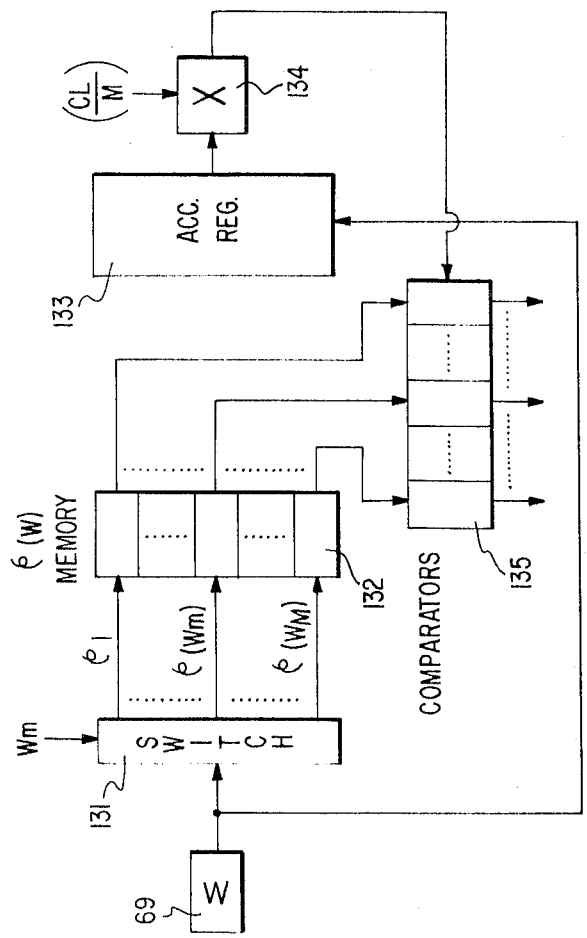

The above and still further objects, features and advantages of the present invention will become apparent upon consideration of the following detailed description of several specific embodiments thereof, especially when taken in conjunction with the accompanying drawings, wherein:

FIG. 1 is a waveform useful in describing the principles upon which the present invention relies;

FIGS. 2A and 2B, together, are a block diagram of a preferred embodiment of the present invention utilized to calculate power spectral density at a plurality of frequencies $w_m$;

FIG. 3 is a block diagram of a preferred embodiment of the automatic scaler employed in the system of FIG. 2; and FIG. 4 is a block diagram of an embodiment of the invention for determining whether a particular frequency component is periodic.

Reference is now made to the waveform of FIG. 1, wherein a function $y=f(t)$ is plotted as a function of time, $t$. One purpose of the apparatus and method of the present invention is to determine what the frequency components are in the function $f(t)$ in the time interval $t_1 \leq t \leq t_N$, assuming that $f(t)$ is analytic within the interval $t_1 \leq t \leq t_N$. The $f(t)$ ordinate at each of the time representing abscissae $t_1, t_2, t_{n11}, t_n, t_{n+1} ... t_{N11}$, and $t_N$, is represented by $y_1, y ... y_{n11}, y_n, y_{n+1}, ... y_{N11}$, and $Y_N$, respectively. The intervals between adjacent values of $t_n$ are considered equal, $\Delta t$ in duration, and relatively small, whereby the function $f(t)$ can be accurately represented as a plurality of straight line functions between each interval. Thereby, the Fourier integral within each of the $\Delta t$ intervals is accurately approximated in accordance with Equation (3) and the spectral power density at a particular frequency $w_1$ can be determined from Equations (5)—(11), supra, once the values of $y_n$ are determined for all integer values of $n$ between 1 and $N$.

The apparatus for solving Equations (5)—(11) is illustrated by FIG. 2. Broadly, the apparatus of FIG. 2 includes section 11 for sampling and storing the values of $y_n$ at the N intervals indicated by FIG. 2. Once the values of the ordinates $y_n$ are determined, the coefficients $A_n$, $B_n$, $C_n$ and $D_n$, given by Equations (7)—(10), are determined in the system portion indicated by reference numeral 12. The coefficients are multiplied in computer network 14 by a plurality of periodic indicating expressions stored in read only memory 13, responsive to the particular $w_m$ being considered. The outputs of computer network 14 are added, on a real time basic, squared and added again in computer network 15, the output of which is indicative of the spectral power density at the particular $w_m$ frequency, e.g. $w_1$, being read from memory 13.

Upon completion of all of the parallel operations required to solve Equation (11) for a particular frequency, read only memory 13 is advanced to a different $w_m$ frequency position and the multiplication, summing and adding operations performed in networks 14 and 15 are repeated. Thereby, network 15 derives a multiplicity of amplitudes, in differing time positions, depending upon the frequency being read from memory 13. Each amplitude is proportional to the spectral power density of the $w_m$ frequency to which memory 13 is stepped. The signals generated by network 15 are applied in sequence to read out network 17, that derives visual indications of power spectral density amplitude. Network 17 responds to signals generated by multiplier network 14 to derive indications as to whether a particular frequency in the spectrum is periodic.

Consideration is now given to section 11, utilized for sampling and storing the values $y_n$, assuming that the computer of FIG. 2 responds to an online, real time signal on lead 21, derived from a process or the like. The analog, real time signal on lead 21 is applied to sample and hold network 22, the output of which is coupled to analog to digital converter 23. Sample and hold network 22 and analog to digital converter 23 are periodically activated at times $t_1, t_2 ... t_{n11}, t_n, t_{n+1} ... t_{N11}$ and $t_N$ by input clock source 24, whereby the analog to digital converter derives a plurality of multibit digital output words respectively indicative of the values $y_1, y_2 ... y_{n11}, y_n, y_{n+1} ... y_{N11}$ and $y_N$, of the signal on lead 21.

Each multibit output word of analog-to-digital converter 23 is applied in sequence to a different one of the N word positions or cells within memory 25 via multiplexing, bilateral switch 26, responsive to pulses from clock source 24, whereby each of the words representing a different $y_n$ is stored at a different cell in the multiword memory. Hence, on completion of the process under consideration, at time $t_N$, each of the multibit memory cells within multiword memory 25 is loaded with a different $y_n$ ordinate value.

While the remainder of the system could function in response to the stored values of $y_n$ originally fed into memory 25, it has been found advantageous to subtract the stored values of $y_n$ from the DC or average value thereof, $\bar{y}$, to minimize word length, which in turn reduces the amount of computing and storage apparatus required. Removing the DC component of the values originally stored in memory 25 does not affect the overall results obtained since the system computes AC spectral power density in response to process signals on lead 21 that usually never have a negative value.

To adjust the values in memory 25 so that the DC component is substantially eliminated, each of the multibit $y_n$ indicating words generated by analog-to-digital converter 23 is applied to AND gate 27, enabled during the entire period when values of $y_n$ are being sampled by the output of input clock 24. AND gate 27 feeds an averaging network comprising digital divider 28 cascaded with accumulator register 29. Divider 28 is adjusted to divide the $y_n$ indicating words derived from converter 23 by the number, $N$, of samples taken in the interval $t_1 \leq t \leq t_N$. Thereby, the total signal amplitude accumulated and stored in register 29 after N samples have been taken of the signal on lead 21 indicates the average value of $f(t)$ in the defined interval.

After the N samples have been taken from the signal on lead 21, a programmer (not shown) deactivates input clock source 24, whereby lead 21 is decoupled from converter 23 and the remainder of the apparatus. Simultaneously with deactivation of input clock 24, indexing clock 31 is activated by the programmer, whereby the stored values of $y_n$ in memory 25 are subtracted from the average value of $f(t)$, $\bar{y}$, stored in accumulator 29. Indexing clock 31 selectively and simultaneously activates corresponding elements in multiplexing switches 26 and 32, respectively connected to load and read out words from each word position of memory 25.

Switch 32 sequentially connects each of the $y_n$ cells in memory 25 via line 34 to digital subtracter 35, that is also responsive to averaging accumulator 29. Thereby, the output of subtracter 25 is a plurality of multibit words, each proportional to the difference between the word stored at readout position of memory 25 and the average value of the signal applied originally to the memory, $(y_n - \bar{y})$. Each output word of subtracter 35 is applied to line 33 and through switch 26 to the same location in memory 25 as the word just previously read out from the memory. Hence, the originally stored value of $y_n$ at position $n$ in memory 25 is fed via switch 32 and lead 34 to subtracter 35, that subtracts it from the contents, $\bar{y}$, of averaging accumulator 29. The output of digital subtracter 35, indicative of $\bar{y} - y_n$, is coupled via lead 33 to switch 26 and the $y_n$ cell in memory 25. The difference value $\bar{y} - y_n$ is stored in the cell $n$ of memory 25, replacing the previously stored value in that cell, in a manner well known to those skilled in the art. After the original value of $y_n$ has been replaced by $\bar{y} - y_n$, indexing clock 31 activates switches 26 and 32 to read out the $y_{n+1}$ word stored in memory 25 in the same manner indicated previously for the $y_n$ word.

After the values of $y_n$ have been normalized and stored in memory 25, system portion 12 is ready to compute and store the coefficients given by Equations (7)—(10), supra. Basically, each of the coefficients defined by Equations (7)—(10) is computed in sequence for the different values of $n$ in network 12 of the computer. Since the values of each coefficient generally involve $y_n$ and $y_{n+1}$, switch 32 includes a pair of output lines 34 and 36 for carrying the $y_n$ and $y_{n+1}$ signals, respectively. Coupling of signals to line 34 during the normalizing operation is prevented with an inhibit gate (not shown) included within switch 32 and activated by the program only during the normalizing operation.

After completion of the normalizing operation, indexing clock 31 is activated by the programmer so that the words in cells $y_n$ and $y_{n+1}$ of memory 25 are simultaneously connected to lines 34 and 36. Hence, for the first output pulse of indexing clock 31 in the portion of the program now being considered, the values of $y_1$ and $y_2$ in the first two cells of memory 25 are connected to lines 34 and 36, respectively. In response to the second output pulse of indexing clock 31, the second and third cells in memory 25 are respectively connected to leads 34 and 36; the sequence continues as stated for each of the sampled values of $f(t)$. Indexing clock 31 derives $(N-1)$ output pulses in the portion of the program now being considered, whereby he signals stored in the $y_{N1}$ and $Y_N$ cells of memory 25 are derived on leads 34 and 36 in response to the last pulse generated by indexing clock 31.

The value of $A_n$ in Equation (7) is computed in digital adder matrix 36 directly from the values of the words on leads 34 and 36. Input leads to adder matrix 37 are sequentially connected to each of the words on lines 34 and 36 in response to activation of switch 32 by indexing clock 31. Each word generated by digital adder 37 representing the $(N-1)$ values of $A_n$ is applied in sequence to a different cell within $(N-1)$ word memory 38 under the control of multiplexing switch 39 that is responsive to indexing clock 31. Switch 39 is virtually identical to switch 26 to sequentially couple each of the $A_n$ coefficients to a different one of the $(N-1)$ cells within memory 38.

The derivation of the $D_n$ coefficient is considerably more complex than the derivation of $A_n$, as a comparison of Equations (7) and (10) reveals. In particular, the $D_n$ coefficient includes factors proportional to number, $n$, of the sample under consideration, as well as the sampled value, $y_n$, at the beginning of the interval. To these ends, the programmer activates a switch (not shown) to selectively apply the output of indexing clock 31 to indexing register 41 only during the portion of the system operation when the coefficients defined by Equations (7)—(10) are being computed.

Indexing register 41 is a counter stepped by indexing clock 31 and includes first and second outputs, for deriving signals respectively indicative of the number $(n)$ and one less than $n$, $(n-1)$, of pulses derived by indexing clock 31 while the program has been activated to compute coefficients. The $n$ and $(n-1)$ outputs of indexing register 41 are respectively applied to digital multipliers 42 and 43, also respectively responsive to the signals on leads 34 and 36. Multipliers 42 and 43 sequentially derive digital words proportional to the products $ny_n$ and $(n-1) y_{n+1}$ during the period of the $n$th pulse from indexing clock source 31. The digital words generated by multipliers 42 and 43 are combined in digital subtracter 44, the output of which is $N-1$) sequential digital words, each indicative of the $D_n$ coefficient in Equation (10). The $(N-1)$ words generated by a subtracter 44 are applied successively to different cells in $(N-1)$ word memory 45 via multiplexing switch 46, that is controlled by indexing clock 31 in the same manner as switch 39. Switches 39 and 46 are simultaneously activated by indexing clock 31 to gate the outputs of adders 37 and subtractor 44 to corresponding positions in memories 38 and 45, each of which includes $(N-1)$ cells.

To derive simultaneously the outputs of multipliers 42 and 43 and adder 37 and compensate for the longer operating time of the multipliers, the adder includes a short duration delay in its output. Thereby, the addition results of matrix 37 are transferred to memory 38 substantially simultaneously with the transfer of data from subtracter 44 into memory 45.

After the coefficients $A_n$ and $D_n$ have been computed and stored in memories 38 and 45, respectively, the coefficients $B_n$ and $C_n$ are computed and stored. To this end, the programmer deactivates indexing clock source 31 and activates memory 38 so that the contents of the $(N-1)$ cells thereof are simultaneously, nondestructively read out into multiplier 47. Multiplier 47 includes two$(N-1)$ prewired multiplication matrices, two for each of the $(N-1)$ cells with $A_n$ memory 38. The prewired matrices within multiplier 47 are arranged so that the variable $A_n$ coefficient stored in the $A_n$ cell of memory 38 is separately multiplied by $n$ and $(n-1)$. Substantially simultaneously with read out of memory 38 into multiplier 47, the programmer activates memory 45 to nondestructively read out all of the $(N-1)$ cells thereof at the same time.

Each of accumulator register arrays 48 and 49 includes $(N-1)$ accumulator cells, one for each of the $(N-1)$ positions of memories 38 and 45. Registers 48 and 49 function as memories for storing and computing the values of $B_n$ and $C_n$, respectively. To this end, the product of $nA_n$ derived from the matrix in multiplier 47 responsive to the $n$th cell of memory 38 is applied to the $B_n$ cell of accumulator register 48, while the product $(n-1)A_n$ output of multiplier 47 is applied to the $C_n$ cell of accumulator register 49. Similarly, the remaining outputs of multiplier 47 are appropriately applied to the inputs of registers 48 and 49. Because the coefficient $C_n$ is always a negative number, as noted from Equation (9), the output of each cell in accumulator register 49 is representative of a negative number.

The values of $A_n$, $B_n$, $C_n$ and $D_n$ respectively stored in memory elements 38, 48, 49 and 45 are successively nondestructively read out under the control of the programmer for a multiplicity, M, of different frequencies $w_m$, the number M being determined by the number of spectral points to be examined. For each value of $w_m$, the outputs of memories 38, 45, 48 and 49 are simultaneously applied in parallel to six arrays 51—56 of multiplication matrices included within computer network 14. Arrays 51—56 are also responsive to signals stored in read only memory 13, that includes four different sections 61—64.

Sections 61—64 included within memory 13 have preloaded therein digital words indicative of periodic functions for each of the selected frequencies, $w_m$, at which power spectrums are computed. Each of memory cells 61—64 includes N output leads, one for each of the N sampling points of FIG. 1, whereby digital signals commensurate with the N sampling points are derived. To sequentially read out data stored in memory 13 indicative of the M different frequencies, omega clock 65 and omega register 66 are provided. Omega clock 65 is activated by the programmer after all of the coefficients have been computed and stored in section 12. In response to each pulse from clock 65, register 66 is advanced to read out a set of values from memory 13 in accordance with a particular value of $w_m$. The outputs on the $n$th line of memory sections 61—64 for the frequency $w$ are respectively:

memory cell 61; $[\cos wn\Delta t - a\cos w(n-1)\Delta t]w^2$ (14)
memory cell 62; $[\sin wn\Delta t - a\sin w(n-1)\Delta t]1/w^2$ (15)
memory cell 63; $[w\Delta t \sin wn\Delta t]1/w^2$ (16)
memory cell 64; $[w\Delta t \cos wn\Delta t]1/w^2$ (17)

For each value of $w_m$, the N outputs of each of memory sections 61—64 are multiplied by the coefficients $A_n$, $A_n$, $B_n$ and $B_n$ in multiplier arrays 51, 52, 53 and 55, respectively. The outputs of sections 63 and 64 are also multiplied by the coefficients $C_n$ in multiplier arrays 54 and 56, respectively. To effect simultaneous multiplication of all the signals applied thereto for any $w_m$, each of array 51—56 includes $N(N-1)$ multiplier matrices.

Multiplier arrays 51—53 and 55 are connected with memory sections 61—64 and the $A_n$ and $B_n$ coefficient memories 38 and 48 to derive the first three terms after the summation signs in Equations (5) and (6). In particular, the $n$th output of memory cell 61 is multiplied by the $n$th output of memory 38 in one matrix within multiplier array 51. The $n$th output of memory cell 62 is multiplied with the $n$th output of $A_n$ coefficient memory 38 in one of the multiplication matrices of multiplier array 52, while multiplier array 53 includes a matrix for responding to the $n$th outputs of memories 63 and 48. Similarly, a multiplication matrix in multiplier array 55 responds to the digital signals on the $n$th outputs of memories 48 and 64. In the manner indicated the remaining matrices in each of multiplied arrays 51, 52, 53 and 54 includes other matrices for responding to correspondingly ordered outputs of memory elements 38, 45, 48 and 61—64.

Matrices in multiplier arrays 54 and 56 respond to differently ordered outputs of memories 63 and 64 and the coefficients stored in register array 49 to derive the last term on the right side of each of Equations (5) and (6). In particular, the $(n-1)$ outputs of memories 63 and 64 are combined in a multiplication matrix in multipliers 54 and 56 with the $C_n$ outputs of memory 49. Thus, for example, the $C_1$ coefficients stored in the first memory cell of memory 49 are multiplied by the output signals on the second lines of storage cells 63 and 64 in matrices of multiplier arrays 54 and 56, respectively. By arranging the output leads of memory cells 63 and 64 in the manner indicated, the storage requirements of memory 13 are reduced by a factor of one-third.

Each matrix within multiplier arrays 51—56, as well as each output of memory sections 61—64, includes an output to indicate the polarity of the signal derived. For matrices in arrays 51—53 and 55, the polarity indicating outputs are identical to the polarity applied to the matrix from memory 13 because the contents of memories 38, 46 and 48 are always positive. The polarity indicating outputs of the matrices in arrays 54 and 56 are, however, always reversed from the outputs of memory 13 applied thereto since the $C_n$ coefficients stored in register 49 are negative.

The digital signals derived from multipliers 51—56 are words representing the amplitude and polarity of components in the Fourier transform of $f(t)$ at the frequency $w_1$ loaded in omega register 66. These Fourier transform component signals are combined in the apparatus included within network 15 to provide measures of the real and imaginary power portions of the signal of FIG. 1 at the frequency $w_1$, in accordance with Equations (5), (6) and (11). In particular, the real an imaginary power portions are derived with digital adder matrices 65.1 and 66.1, respectively. Digital adder 65.1 is an adding matrix responsive to all of the $(N-1)$ output signals of each of multiplier arrays 51, 53 and 63, while adding matrix 66.1 responds to all of the $(N-1)$ outputs of each of multiplier arrays 52, 54 and 56.

To derive a signal proportional to the total power spectrum of $f(t)$ for the selected frequency, $w_1$, the outputs of adders 65.1 and 66.1 are coupled to digital squaring networks 67 and 68, respectively. The digital signals derived by squaring networks 67 and 68 are applied to adding matrix 69, the output of which is directly proportional to $\Phi(w_1)$ for the particular value of $w_m$ in register 66.

Omega clock 65 is adjusted so that adjacent output pulses thereof are sufficiently spaced to enable network 15 to derive $\Phi(w_1)$ prior to another value of omega being loaded in resister 66. After each computation of $\Phi*w_1$, the contents of matrix 69 are applied to read out means 17, where they are stored for indication purposes. After readout of the contents of addition matrix 69, omega clock 65 generates an output pulse to advance the count in omega register 66 to the next $w_m$ and set the outputs of memory sections 61—64 to values different from those derived by those cells during the previous value of omega. After sections 61—64 have been actuated to output levels associated with the next $w_m$, omega clock 65 generates a control for enabling multipliers 51—56 to be responsive to the signals stored in memories 38, 45, 48 and 49, whereby a new computation cycle for the next $w_m$ is initiated. In the described manner, addition matrix 69 successively derives a plurality of sequential outputs indicative of the power spectrum of the signal originally applied to lead 21.

Read out means 17 responds to the plurality of sequential power spectrum indicating words derived by adder 69 within network 15 to provide an X—Y chart indication of the spectral power density at each of the values of omega.

Because no a priori knowledge is usually available regarding the relative amplitudes derived from network 15 for the different values of $\Phi(w_m)$, automatic scaler 71 is connected to be responsive to the output of summing matrix 69. Broadly, automatic scaler 71 stores each of the words successively generated by adding matrix 69 and, after all of the values of omega have been stepped from read only memory 13, adjusts each value of $\Phi(w_1)$ so that no off scale readings can be derived from an X-Y recorder. Automatic scaler 71 also adjusts all of the values of $\Phi(w_m)$ so that no off scale readings can be derived from an X-Y recorder. Automatic scaler 71 also adjusts all of the values of $\Phi(w_m)$ so that the largest amplitude applied to the recorder is at least a predetermined percentage of full scale, such as 50 percent. After appropriate scaling of the outputs of summation matrix 69, automatic scaler 71 derives a plurality of sequential binary words, one for each of the scaled values of $\Phi(w_m)$. As each value of $\Phi(w_m)$ is read from scaler 71, the scaler derives an output indicative of the frequency, $w_m$, for which the spectral reading corresponds.

The $w_m$ and $\Phi(w_m)$ outputs of automatic scaler 71 are applied to the X and Y inputs, respectively, of digital X-Y recorder 72, which may be a typewriter. Typewriter X-Y recorder 72 is also supplied by automatic scaler 71 with a signal indicative of the scale factor introduced by scaler 71, whereby the typewriter prints a visual indication of the proportionality factor introduced by scaler 71.

Readout system 17 also includes network 73, which is utilized for determining if the spectral content at a particular frequency is great enough to presume, with a predetermined degree of certainty, that the signal at omega is periodic. Two embodiments for the apparatus of network 73 are described in detail infra.

Reference is now made to FIG. 3 of the drawings, wherein there is illustrated a preferred embodiment of the apparatus employed in automatic scaler 71, FIG. 2. Broadly, it is the function of scaler 71 and the apparatus illustrated by FIG. 3 to store each of the computed values of $\Phi(w_m)$ derived from the digital spectrum computer broadly designated by elements 11—15. After all of the values of $\Phi(w_m)$ have been stored, each value of $\Phi(w_m)$ is multiplied by a relatively large, constant number, for example approximately $10^4$, so that no binary digits should be to the right of the binal point and a full scale reading is virtually assured for the Y deflection of recorder 72 for at least one value of $\Phi(w_m)$. Next, each stored and multiplied amplitude of $\Phi(w_m)$ is compared with the full scale response of recorder 72 in the Y direction. When the amplitude of $\Phi(w_m)$ exceeds the full scale response of recorder 72 in the Y direction, all of the stored values of $\Phi(w_m)$ are divided by a predetermined factor, such as two. The preceding step is repeatedly performed until the stored values of $\Phi(w_m)$ for $w_m$ is less than the full scale response of recorder 72 in the Y direction. Once the value of $\Phi(w_m)$ is less than the full scale Y response of recorder 72, the comparison and division operations are performed on $\Phi(w_m)$ for the next value of $w_m$. Preferably, the division factor is selected as 2 to enable the maximum amplitude indicated by recorder 72 to fall between 50 percent and 100 percent of full scale of the recorder Y response.

The scaling apparatus is illustrated by the block diagram of FIG. 3, wherein the unillustrated programmer of FIG. 2 is designated as programmer 81. Programmer 81 controls the opening and closing of switches in the scaler and the manipulation of data therein in a prearranged sequence that is controlled by the valve of the data. The M sequentially generated, serial binary words indicative of each valve of $\Phi(w_m)$ generated by the digital spectrum computer comprising blocks 11—15, FIG. 2, are gated in series to a different one of M registers in shift register bank 82 via bidirectional multiplexing switch 83 and normally open switch 84, responsive to an output of programmer 81 on lead 85.

Switch 84 is closed in response to a binary one activation signal from programmer 81 on lead 85 during the entire interval that the M values of $\Phi(w_m)$ are being computed by digital spectrum computer 11—15. Multiplexing switch 83 is activated by programmer 81 in response to successively generated signals on lead 86 to route the M different words indicative of $\Phi(w_m)$ for the different values of omega into different registers within register array 82. Thereby, programmer 81 steps multiplexing switch 83 from position to position upon completion of each computation of $\Phi(w_m)$ by digital spectrum computer 11—15. For example, while the first power spectrum, at frequency $w_1$, is being computed, switch 84 is closed and multiplexer 83 is arranged to connect the output of digital spectrum computer 11—15 to the register in array 82 designated as $\Phi(w_1)$. Upon completion of the computation of $\Phi(w_1)$, and simultaneously with the derivation of a pulse from omega clock 65, FIG. 2, programmer 81 generates a pulse on lead 86 to step multiplexing switch 83 so that the register designated as $\Phi(w_2)$ in array 82 is connected to the output of digital spectrum computer 11—15. In a similar manner, each of the remaining shift registers in array 82 is selectively connected to the output of computer 11—15.

Each of the shift registers within array 82 has a sufficient number of stages to store all of the binary digits in each value of $\Phi(w_m)$, as well as an adequate number of stages to effect multiplication of each value of $\Phi(w_m)$, as computed, by a factor of $2^{13}=8,192$. Thereby, multiplication of each computed value of $\Phi(w_m)$ by $2^{13}$ can be effected within each shift register of array 82 merely by shifting the contents of each register 13 stages to the right. To this end, programmer 81 includes output lead 87, connected in parallel with each of the shift registers comprising array 82. After all of the M values of $\Phi(w_m)$ have been stored in the registers comprising array 82 and switch 84 is opened, programmer 81 activates lead 87 with 13 successive pulses that shift the contents of each of the registers 13 stages to the right. The values of $\Phi(w_m)$ have now been multiplied by the predetermined factor of $2^{13}=8192$, whereby none of the values of $\Phi(w_m)$ includes a fraction and a full scale response will be derived from recorder 72 for at least one value of $\Phi(w_m)$.

The system is now ready to reduce the values of $\Phi(w_m)$ so that no off scale Y readings are derived from recorder 72. To this end, each of stored values of $\Phi(w_m)$ in shift register array 82 are sequentially compared with the maximum response of recorder 72 in the Y direction, a predetermined factor prewired into fixed register 88 in multibit, binary comparator 89. The outputs of like numbered stages within the lowered stages of the registers of array 82 are connected in parallel to an input of comparator 89 to be compared with the value for the corresponding stage stored in fixed register 88. Comparator 89 responds to the signals applied thereto to derive separate outputs on leads 94 and 93, respectively indicating that the maximum response is less than the contents of array 82 applied thereto and the maximum response equals or is greater than the shift register signal.

To sequentially read out the signal stored in only one of the registers in array 82, shift register 91, sequentially responsive to pulses from programmer 81 on lead 92, is provided. Shift register 91 includes a number of states equal to M, the number of frequency responses stored in shift register array 82. Each stage of shift register 91 is connected to effect read out of a different one of the M $\varphi(w_m)$ registers in array 82. To selectively shift the contents of shift register 91, programmer 92 includes circuitry responsive to the outputs of comparator 89 on lead 93, whereby the shift register 91 contents are only shifted in response to the value of $\varphi(w_m)$ readout from array 82 being less than the maximum response amplitude of recorder 72. The signal on lead 93 is routed through programmer 81 to lead 92 to advance shift register 91. In response to the value of $\varphi(w_m)$ readout from array 82 being greater than the fixed amplitude stored in register 88, comparator 89 derives a signal on lead 94. The signal on lead 94 is coupled in parallel to a shift left input for each of the cells within shift register array 82. By shifting the contents of each of the signals stored in the cells of shift register 82 to the left one place, each of the values of $\varphi(w_m)$ is divided by 2, and shifting to the right one place multiplies $\varphi(w_m)$ by 2.

After all of the values of $\varphi(w_m)$ in the registers of array 82 have been appropriately scaled, the last stage of shift register 91 is loaded while a signal is generated by comparator 89 on lead 94. These two signals are combined in AND gate 95, the output of which is coupled to programmer 81. The output of AND gate 95 energizes programmer 81, whereby normally closed switches 96 and 97, in series with the shifting control input terminals of the registers in array 82, are opened. Simultaneously, programmer 81 generates a control voltage to close normally open switch 98, connected in series between multiplexer 83 and the Y input of digital X-Y readout 72. While switch 98 is being closed, switch 99, in series with the X input of readout 72 and the output of programmer 81 on lead 92, is closed. Digital X-Y recorder 72 is preferably a typewriter arranged so that the Y input thereof produces a number of marks in the Y direction of an orthogonal display commensurate with the digital value of the signal applied thereto for each of the M $w_m$ X positions. The X input of recorder 72 responds to each input pulse coupled through switch 99 to shift the display one place to the right along the X axis.

Sequential read out of the values of $\varphi(w_m)$ stored in the different registers of array 82 is accomplished by programmer 81 after opening of switches 96 and 97 and closure of switches 98 and 99. After those switches have been closed, programmer 81 periodically derives pulses on lead 92 to step the contents of shift register 91 from step to step. As each stage of shift register 91 is activated, the contents of the corresponding $\varphi(w_m)$ cell in array 82 is read out through multiplexing switch 83, actuated in synchronism with the different stages of shift register 91, by virtue of the connection of lead 92 to lead 86 through OR gate 101. As each pulse is supplied by programmer 81 to lead 92, corresponding pulses are applied through switch 99 to the X input of recorder 72, whereby the values of $\varphi(w_m)$ are visually plotted by the recorder at the different X positions thereof.

The operation of the scaler of FIG. 3 will now be summarized. Initially, switch 84 is closed by programmer 81 and multiplexer 83 is activated to a plurality of different positions, on a time sequenced basis, whereby different values of $\varphi(w_m)$ are loaded into the different registers comprising array 82. After the values of $\varphi(w_m)$ have been appropriately stored in array 82, programmer 81 is activated to derive a signal on lead 85, whereby switch 84 is open circuited and the output of computer 15 is decoupled from shift register array 82.

The contents of each cell within shift register 82 are shifted to the right by 13 places, to effect a multiplication by 8,192 response to 13 sequentially generated pulses derived by programmer 81 on lead 87, as coupled to each of the shift registers through switch 96. The value of $\varphi(w_1)$ multiplied by 8,192, as stored in the first register of array 82 is compared with the maximum response of recorder 72 in the Y direction, stored in register 88, by comparator 89. Assuming that the value stored in the $\varphi(w_1)$ register of array 82 is less than the value stored in register 88, comparator 89 derives a signal on lead 93 that is coupled through programmer 81.

The signal on lead 92 steps the contents of shift register 91 to the second stage, whereby read out of 8,192 $\varphi(w_2)$ into comparator 89 is performed. Assuming that the input to comparator 89 from shift register array 82 is greater than the stored value in register 88, comparator 89 derives an output signal on lead 94. The output signal on lead 94 is coupled to the shift left control input terminal of each of the M registers in array 82, whereby the values of $\Phi(w_m)$ for each of the $M$ $w_m$ are divided by 2. The value of 4,096 $\Phi(w_2)$, now stored in the second register of array 82 is again compared with the fixed number in register 88 by comparator 89. Assuming now that the fixed response in register 88 is greater than the value of the binary words supplied to comparator 89 by array 82, an output is derived by the comparator on lead 93 and coupled by programmer 81 to shift register 91.

The operations proceed in the manner described until all of the values in shift register 82 have been compared with the fixed number in register 88. After all of the signals stored in the multiplicity of registers forming array 82 have been compared with the fixed number in register 88, and all of the $M$ values of $\Phi(w_m)$ have been appropriately scaled, read out of the contents of the registers of array 82 into recorder 72 is performed in the manner indicated supra.

Frequently it is desirable to determine if a particular frequency in the spectrum being analyzed is periodic, with a predetermined degree of certainty. The present invention includes computing element 73 for effecting this determination. Broadly, computing element 73 determines the average spectral density for all $M$ frequencies analyzed by the computer comprising blocks 11, 12, 13 and 14, FIGS. 2A and 2B as:

$$\varphi(W)_{AV} = \frac{1}{M}\sum_{m=1}^{M}\varphi(W_m)$$

The value of $\Phi(w)_{AV}$ is multiplied by a predetermined factor, depending upon the degree of confidence desired that the function is periodic. It it is desired to ascertain that the function is periodic with a 99 percent certainty, the average value is multiplied by a factor of 6.6, while the average valve is multiplied by a factor of 3.86 for a 95 percent certainty, i.e., a 95 percent confidence level. The product of $\Phi(w)_{AV}$ and the predetermined factor is compared with each of the values of spectral density, $\Phi(w_m)$. If the spectral density for a particular frequency exceeds the product, an indication is obtained that the component is periodic, to the degree of certainty introduced by the proportionality factor.

While it may seem that the highest confidence level or degree of certainty is desired, this is not always the case because too high a level may exclude significant sources of periodic disturbances. Hence, it is generally considered more advisable to utilize a confidence level of 95 percent than one of 99 percent.

The apparatus utilized for determining if $w_m$ is periodic is illustrated by FIG. 4. The apparatus of FIG. 4 comprises multiplexing switch 131, responsive to the $\Phi(w_m)$ output of adder 69, FIG. 2B. The $M$ $\Phi(w_m)$ outputs sequentially derived by adder 69 are coupled through switch 131 to $M$ individual locations within memory 132 under the control of the programmer included in the computer circuitry of FIG. 2. The programmer of FIG. 2 selectively routes each of the $\Phi(w_m)$ signals to a separate location within memory 132, whereby each location within the memory stores a digital signal commensurate with $\Phi(w_m)$ upon the completion of a computation cycle of the apparatus illustrated by FIG. 2.

As the $M$ spectral density signals are being read into memory 132, network 73, comprising FIG. 4, is determining the average power spectral density, $\Phi(w)_{AV}$ for the $M$ different frequencies. To compute average power spectral density, M sequential outputs of adder matrix 69, each indicative of a value of $\Phi(w_m)$, are fed into accumulator register 133. Thereby, upon completion of the $M$ computations of $\Phi(w_m)$ register 133 is loaded to a count indicative of $$\sum_{m=1}^{M}\varphi(W_m)$$

The contents of register 133 are read out into digital multiplier matrix 134 after all $M$ computations have been completed in the system of FIG. 2. Multiplier matrix 134 responds to the $$\sum_{m=1}^{M}\varphi(W_m)$$

signal read out from register 133 and a fixed signal representing the confidence level divided by the number of frequencies in the spectrum, $M$. Multiplier matrix 134 is of the prewired type and effectively multiplies the average power spectrum over all of the frequencies $w_m$ by the confidence level determining factor, which may be 3.86 or 6.66 for confidence levels of 95 percent and 99 percent, respectively.

The product of average power spectral density and confidence level, as derived from multiplier 134, is applied to $M$ comparators included within array 135. Each of the comparators within array 135 responds to the output of multiplier 134 and a different one of the $M$ cells within memory 132, whereby the mth matrix in array 135 is connected to the mth position in memory 132. The programmer of FIG. 2 activates all of the comparators of array 135 to be responsive to the outputs of memory 132 substantially simultaneously with the derivation of the confidence level output by multiplier 134. In response to the input to the mth matrix in comparator array 135 from the mth cell in memory 132 exceeding the output of multiplier 134, the mth comparator matrix derives a binary one output signal, indicative of $w_m$ being periodic with a probability determined by the multiplication factor supplied to multiplier 134. In an opposite manner, if a binary zero level is derived from the mth comparator in array 135, there is a 95 percent probability that the component having a frequency $w_m$ is not periodic. Each binary one output of a comparator in array 135 activates a corresponding frequency position in recorder 72 with a predetermined indicia, such as a star, to indicate visually that the component is probably periodic. While I have described and illustrated one specific embodiment of my invention, it will be clear that variations of the details of construction which are specifically illustrated and described may be made. For example, the real time analog input signal applied to the system of FIG. 2 on lead 21 and the corresponding sample and hold and analog-to-digital converters can be replaced with a manual input if a chart indication of the signal amplitude versus time is available and has been scaled manually. Other changes are that the prewired system described can be replaced with a general purpose computer, appropriately arranged to solve the equations given, or many of the components can be time division multiplexed.

I claim:

1. In an analyzer for determining the spectral content at a frequency $\omega_m$ of a signal $f(t)$ within the time interval $t_1 \leq t_N$, said interval being divided into a multiplicity of subintervals $\Delta t_1, \Delta t_2 \ldots \Delta t_i \ldots \Delta t_{N-1}$, comprising means responsive to a multiplicity of discrete sampled values of $f(t)$ within $t_1 \leq t \leq t_N$, one of said sampled values being taken during each of the subintervals, means responsive to said sampled values for computing terms forming the real and imaginary power spectrum coefficients of $f(t)$ at $\omega_m$ during the subinterval $\Delta t_i$ from a predetermined continuous functional variation during $\Delta t_i$, a point on the functional variation during $\Delta t_i$ including a sampled value during $\Delta t_i$, where $i$ is successively every value between 1 and N-1, and means for combining said computed components.

2. The analyzer of claim 1 wherein said means for computing comprises means for computing:

$$\int_{t_n}^{t_{n+1}} g(t) \sin \omega_m t \, dt$$

and $$\int_{t_n}^{t_{n+1}} g(t) \cos \omega_m t \, dt$$

where:
$t_n$ and $t_{n+1}$ are the boundaries of the subinterval $t_i$, and
$g(t)$ is said predetermined continuous functional variation.

3. The analyzer of claim 1 wherein $g(t) = at + b$, where $a$ and $b$ are constants indicative of a sampled value of $f(t)$ during $\Delta t_i$.

4. The analyzer of claim 3 wherein said computing means includes means for approximating $g(t)$ as a predetermined function within the subinterval $\Delta t_i$ in response to sampled values at the beginning and end of $\Delta t_i$.

5. The analyzer of claim 4 wherein each of said sampling subintervals is of the same duration, equal to $\Delta t$, said means for computing including means for storing signals indicative of the values of functions proportional to:

$\cos \omega_m n \Delta t$ and $\sin \omega_m n \Delta t$, and means for combining said stored signals with signals indicative of the sampled values at the beginning and end of each subinterval.

6. The analyzer of claim 2 wherein said computing means includes means for approximating $g(t)$ as a predetermined function within the subinterval $\Delta t_i$ in response to sampled values at the beginning and end of $\Delta t_i$.

7. A spectrum analyzer for determining the power density at a plurality of frequencies of a signal $f(t)$ within the time interval $t_1 \leq t \leq t_N$, said interval being divided into a multiplicity of subintervals $\Delta t_1, \Delta t_2 \ldots \Delta t_i \ldots \Delta t_{N11}$, comprising means responsive to a multiplicity of discrete sampled values of $f(t)$ within $t_1 \leq t \leq t_N$, one of said sampled values being taken during each of the subintervals, means responsive to said sampled values for computing the terms forming the real and imaginary power spectrum components of $f(t)$ for each of said frequencies during the subinterval $\Delta t_i$ from a predetermined continuous functional variation during $\Delta t_i$, a point on the functional variation during $\Delta t_i$ including a sampled value during $\Delta t_i$, where $i$ is successively every value between 1 and N-1, and means separately combining the computed components for each of said frequencies for deriving a plurality of signals, each indicative of the power density of $f(t)$ at a different one of said frequencies.

8. The analyzer of claim 7 wherein said computing means includes means for computing:

$$\int_{t_n}^{t_{n+1}} g(t) \sin \omega_m t \, dt$$

and $$\int_{t_n}^{t_{n+1}} g(t) \cos \omega_m t \, dt$$

where:
$t_n$ and $t_{n+1}$ are the boundaries of the subinterval $\Delta t_i$;
$g(t)$ is said predetermined continuous functional variation, and
$\omega_m$ is selectively each of the plurality of frequencies.

9. The analyzer of claim 8 wherein each of said sampling subintervals is of the same duration equal to $\Delta t$, said computing means including means for storing signals indicative of the values of functions proportional to:

$\cos \omega_m n \Delta t$ and $\sin \omega_m n \Delta t$, means for combining said stored signals with signals indicative of a sampled value within each of said intervals.

10. The analyzer of claim 8 further including readout means responsive to the power density signal for each frequency for simultaneously displaying the power density amplitude of a plurality of said frequencies as a displacement, said readout means having a predetermined full scale response, and means responsive to the largest amplitude power density signal for scaling the amplitudes of all of the power density signals displayed by the same factor to prevent the largest power density amplitude displayed from exceeding said full scale response.

11. The analyzer of claim 7 further including readout means responsive to the power density signal for each frequency for simultaneously displaying the power density amplitude of a plurality of said frequencies as a displacement, said readout means having a predetermined full scale response, and means responsive to the largest amplitude power density signal for scaling the amplitude of all of the power density signals displayed by the same factor to prevent the largest power density amplitude displayed from exceeding said full scale response and enable the largest power density amplitude displayed to be greater than a predetermined percentage of said full scale response.

12. In an analyzer for determining the spectral content at a frequency $\omega_m$ of a signal $f(t)$ within the time interval $t_1 \leq t \leq t_N$, said interval being divided into a multiplicity of subintervals $\Delta t_1, \Delta t_2 \ldots \Delta t_i \ldots \Delta t_{N11}$, comprising means responsive to a multiplicity of discrete sampled values of $f(t)$ within $t_1 \leq t \leq t_N$, one of said sampled values being taken during each of the subintervals, means responsive to said sampled values for computing terms forming the power spectrum coefficients of $f(t)$ at $\omega_m$ during the subinterval $\Delta t_i$ from a predetermined continuous functional variation during $\Delta t_i$, a point on the functional variation during $\Delta t_i$ including a sampled value during $\Delta t_i$, where $i$ is successively every value between 1 and N-1, and means for combining said computed components.

13. The analyzer of claim 12 wherein said predetermined continuous functional variation is $f(t) = at + b$, where $a$ and $b$ are constants indicative of a sampled value during $\Delta t_i$.

14. The analyzer of claim 13 wherein said computing means including includes means for approximately $g(t)$ as a predetermined function within the subinterval $\Delta t_i$ in response to sampled values at the beginning and end of $\Delta t_i$.

15. A method of analyzing the spectral content at a frequency $\omega_m$ of a function $f(t)$ within the time interval $t_1 \leq t \leq t_N$ with a processor including a memory and calculating means, said interval being divided into a multiplicity of subintervals $\Delta t_1 \ldots \Delta t_i \ldots \Delta t_{N11}$, comprising the steps of: (a) storing in the memory first signals indicative of a discrete sampled amplitude of $f(t)$ during each of the subintervals, (b) feeding the stored first signals from the memory to the calculating means, (c) in the calculating means operating on the first signals to derive a second signal for each subinterval indicative of the power spectrum components at $\omega_m$ of a predetermined continuous functional variation including a stored signal indicative of $f(t)$ for the subinterval, and (d) accumulating in the calculating means second signals indicative of the power spectrum components at $\omega_m$ of the different subintervals to derive an indication of the power density of $f(t)$ at $\omega_m$.

16. The method of claim 15 wherein the spectral content of $f(t)$ is analyzed for a gamut of frequencies $\omega_1, \omega_2 \ldots \omega_m \ldots \omega_M$ and further including the steps of repeating steps (b), (c) and (d) for each of the frequencies in the gamut.

17. The method of claim 16 further including the steps of operating on the accumulated indication of the power density of $f(t)$ for each frequency of the gamut in the calculating means to derive an indication of the average power density of $f(t)$ over the gamut, and in the calculating means comparing the power spectral density of $f(t)$ for each of the frequencies in the gamut with the average power spectral density of $f(t)$ over the gamut, in the calculating means modifying the magnitude of one of the compared quantities by a predetermined factor prior to the comparison step, said factor changing the relative amplitudes of the compared quantities for each frequency in accordance with a statistical function related to the probability of each frequency in the gamut being periodic.

18. The method of claim 45 wherein the spectral content is analyzed for a gamut of frequencies $\omega_1, \omega_2 ... \omega_m ... \omega_M$, further including the steps of repeating steps (b), (c) and (d) for each of the frequencies in the gamut, and displaying the indication of the power density of $f(t)$ for each of the frequencies of the gamut versus the gamut frequencies.

19. A method of determining if a frequency component $\omega_m$ in a function $f(t)$ analyzed by digital computer means exists with a predetermined probability, said computer means including a memory and calculating means comprising in said calculating means analyzing the function in response to discrete sampled values of $f(t)$ at a gamut of frequencies $\omega_1 ... \omega_k ... \omega_M$ to derive indications of the power spectral density of $f(t)$ for each of the frequencies of the gamut, where $k$ is successively $1 ... m ... M$, feeding a functional indication of power spectral density for each value of $k$ to the memory, calculating in the calculating means the average power spectral density of $f(t)$ for all of the frequencies in the gamut, comparing in the calculating means functions of the relative magnitudes of the power spectral density of $f(t)$ for each $\omega k$ stored in the memory means and the computed average power spectral density, and prior to comparing the relative magnitudes changing one of the compared magnitudes by a predetermined factor in the calculating means, said fourth factor changing the relative amplitudes of the compared magnitudes in accordance with a statistical function related to the probability of $\omega_m$ existing in $f(t)$.

20. A method of determining if a frequency component $\omega_m$ in a function $f(t)$ analyzed by digital computer means exists with a predetermined probability, said computer means including a memory and calculating means, comprising in said calculating means analyzing the function in response to discrete sampled values of $f(t)$ to derive an indication of the power spectral density of $f(t)$ for $\omega_m$, in the calculating means calculating an indication of the average power spectral density of $f(t)$ over a multifrequency range including $\omega_m$, storing a function of at least one of the indications in the storage means, and thereafter in the calculating means responding to the storage means to compare the relative magnitudes of a function of the power spectral density of $f(t)$ at $\omega_m$ with a function of the calculated average power spectral density of $f(t)$.

21. Apparatus for determining if a function $f(t)$ that includes frequency components in a spectrum $\omega_1 \leq \omega \leq \omega_M$ is periodic with a predetermined probability at one of the frequencies, $\omega_m$, in the spectrum during a time interval $t_1 \leq t \leq t_N$ comprising digital computer means responsive to discrete samples of $f(t)$ for computing a first signal commensurate with a power spectral density indication of $f(t)$ at $\omega_m$ during said interval, means responsive to $f(t)$ for deriving a second signal indicative of the average power density of $f(t)$ within said spectrum during said interval, and means responsive to said computing and deriving means for comparing the relative amplitudes of the computed signal of power spectral density of $f(t)$ at $\omega_m$ with the derived average power density signal.

22. The apparatus of claim 21 wherein said means for deriving includes means for deriving a signal magnitude directly proportional to the average power density of $f(t)$ within said interval and spectrum, and means for multiplying said signal magnitude by a factor determined by said predetermined probability.

23. The apparatus of claim 21 wherein said means for deriving the signal indicative of average power spectral density of $f(t)$ at $\omega_m$ includes means for deriving the Fourier transform of $f(t)$ at a plurality of discrete frequencies, including $\omega_m$, within said spectrum.

24. The apparatus of claim 23 wherein said Fourier transform deriving means includes means for each of said plurality of discrete frequencies for deriving the Fourier transform of $f(t)$ for a multiplicity of discrete continuous time intervals together covering the entire time interval of $t_1 \leq t \leq t_N$.

25. The apparatus of claim 21 further including means responsive to said computing means for displaying the power spectrum of $f(t)$ at each of said $w_m$, said displaying means being responsive to said comparing means for indicating what values of $w_m$, if any, are periodic with said probability.

26. A system for displaying the amplitudes of a signal comprising readout means responsive to the signal for simultaneously displaying a plurality of the amplitudes of the signal as displacements, said readout means having a predetermined full scale response, and means responsive to the largest amplitude of the signal for scaling all the displayed amplitudes of the signal by the same factor to prevent the largest displayed signal amplitude from exceeding said full scale response, said scaling means including means for storing all of the amplitudes, means for successively comparing each of said amplitudes with the full scale response, and means for dividing all of the stored amplitudes by a predetermined factor in response to said comparing means indicating that an amplitude exceeds full scale.

27. The system of claim 26 wherein said scaling means includes means responsive to the largest amplitude of the signal for enabling the largest displayed signal amplitude to be greater than a predetermined percentage of said full scale response.

28. A system for displaying the power spectrums of a signal at a plurality of frequencies, comprising means responsive to the signal for deriving a plurality of indications, each being proportional to the power density of the signal at a different frequency, readout means responsive to the indications for simultaneously displaying the amplitudes of a plurality of the indications as displacements, said readout means having a predetermined full scale response, and means responsive to the largest amplitude of the indications for scaling all the amplitudes of the displayed indications by the same factor to prevent the largest displayed indication amplitude from exceeding said full scale response.

29. The system of claim 28 wherein said power density indication deriving means includes digital computer means and further including means responsive to the derived power density indication for deriving an indication with a predetermined probability which frequencies exist in the signal.

30. The system of claim 29 wherein said power density indication deriving means includes digital computer means and said displaying means comprises a digital X-Y recorder for recording amplitude versus frequency, said recorder including means responsive to the periodic indication for marking frequency values having probable periodicity and means responsive to the scaling means for indicating the amount by which all of the displayed amplitudes are scaled.

31. A spectrum analyzer for a signal comprising digital computer means responsive to discrete samples of the signal for computing indications of spectral amplitude versus a spectrum of frequencies, and means responsive to the computed spectral amplitude indications for indicating with a predetermined probability which of the amplitude indications, if any, are associated with actual frequencies of the signal.

32. The analyzer of claim 31 further including means responsive to the computer for plotting spectral amplitude versus frequency, said plotting means having a predetermined full scale amplitude response, and means responsive to the maximum spectral amplitude for similarly scaling all of said amplitude indications to prevent a full scale amplitude response from being derived by said plotting means.

33. The analyzer of claim 32 further including separate means for activating said plotting means to indicate which of the amplitude variations is associated with actual frequencies of the signal.

34. The analyzer of claim 31 further including means for plotting spectral amplitude versus frequency, said plotting means including means for visually identifying which of said frequencies are periodic with said probability.

35. Apparatus for determining if a function $f(t)$ that may include frequency components in a spectrum $\omega_1 \leq \omega \leq \omega_M$ contains an actual periodic component with a predetermined probability at one of the frequencies, $\omega_m$, in the spectrum during a time interval $t_1 \leq t \leq t_N$ comprising digital computer means responsive to discrete samples of $f(t)$ for computing a first signal commensurate with a power spectral density indication of $f(t)$ at $\omega_m$ during said interval, means responsive to $f(t)$ for deriving a second signal proportional to the average power density of $f(t)$ within said spectrum during said interval, means responsive to said computing and deriving means for comparing the relative amplitudes of the computed signal value of power spectral density of $f(t)$ at $\omega_m$ with the derived average power density signal, and means for changing the amplitude of one of the signals fed to the comparing means by a predetermined factor, said factor changing the relative amplitudes of the compared signals in accordance with a statistical function related to the probability of each frequency in the gamut being periodic.